United States Patent [19]

Higuchi et al.

[11] 4,243,370
[45] Jan. 6, 1981

[54] DIE FOR EXTRUDING A HONEYCOMB STRUCTURAL BODY

[75] Inventors: Noboru Higuchi, Nagoya; Shoji Futamura, Kawasaki, both of Japan

[73] Assignees: NGK Insulators, Ltd.; Institute of Technology Precision Electrical Discharge Works, both of Japan

[21] Appl. No.: 966,220

[22] Filed: Dec. 4, 1978

[30] Foreign Application Priority Data

Dec. 7, 1977 [JP] Japan .............................. 52-146906

[51] Int. Cl.³ .............................................. B29F 3/04
[52] U.S. Cl. .................................... 425/462; 425/467; 425/DIG. 111
[58] Field of Search ................... 425/462, 463, 382 R, 425/464, 466

[56] References Cited

U.S. PATENT DOCUMENTS

| 1,874,503 | 8/1932 | Greenwood | 425/463 |
|---|---|---|---|
| 2,308,552 | 1/1943 | Spinozzi | 425/199 |
| 2,908,037 | 10/1959 | Harkenrider | 425/192 R |
| 2,974,613 | 3/1961 | Maldari | 425/462 |
| 3,038,202 | 6/1962 | Harkenrider | 425/464 |
| 3,095,607 | 7/1963 | Cobb | 425/463 |
| 3,259,938 | 7/1966 | Martin | 425/464 |
| 3,380,128 | 4/1968 | Cremer et al. | 425/382 R |
| 3,406,435 | 10/1968 | Dietzsch | 425/382 R |
| 3,981,657 | 9/1976 | Orso et al. | 425/382 R |
| 4,104,015 | 8/1978 | Meyer | 425/463 |
| 4,118,456 | 10/1978 | Blanding et al. | 425/464 |
| 4,168,944 | 9/1979 | Morikawa et al. | 425/464 |
| 4,178,145 | 12/1979 | Hamamoto et al. | 425/467 |

FOREIGN PATENT DOCUMENTS 50-34351 4/1975 Japan ................................. 264/178

Primary Examiner—John C. Bleutge
Assistant Examiner—A. H. Koeckert
Attorney, Agent, or Firm—Stevens, Davis, Miller & Mosher

[57] ABSTRACT

A die for extruding a honeycomb structural body which comprises a throttle portion having a plurality of openings where the forcedly supplied raw stock flow is throttled at the rear surface side of the die, a reservoir portion provided with a plurality of guide channels, an opening portion having a plurality of openings and guide slots, and discharge slits.

1 Claim, 8 Drawing Figures

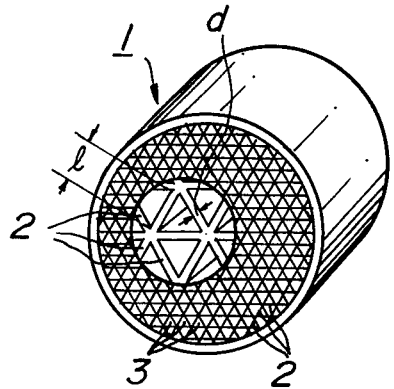
FIG._1
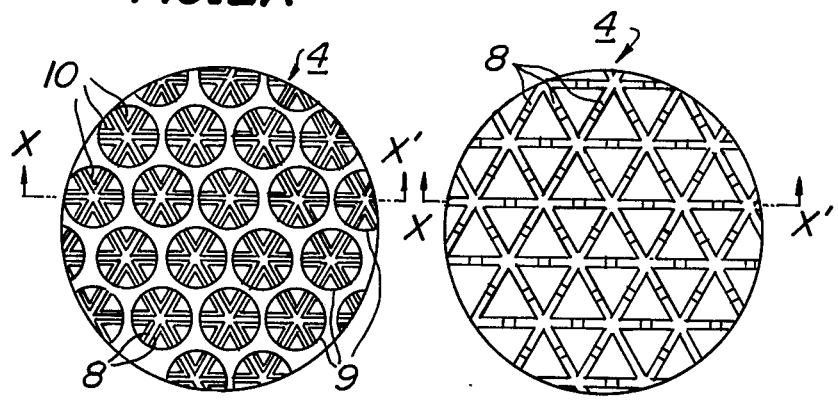
FIG._2A    FIG._2B
FIG._2C
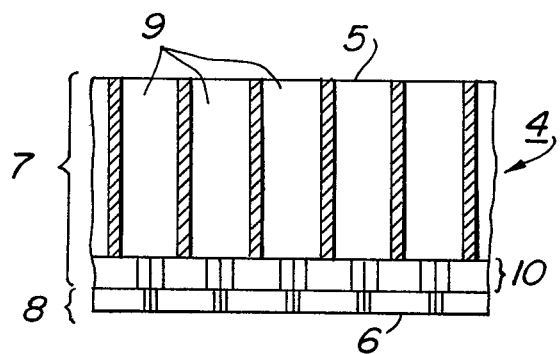

DIE FOR EXTRUDING A HONEYCOMB STRUCTURAL BODY

The present invention relates to a die for extruding a honeycomb structural body. Particularly it relates to a die for extruding a honeycomb structural body, which is simple to produce and which possesses increased mechanical strength, as well as decreased side surface resistance during extrusion.

For a better understanding of the invention, reference is made to the accompanying drawings, wherein:

FIG. 1 shows a perspective view for explaining the conception of the honeycomb structural body;

FIGS. 2A, 2B and 2C show one embodiment of the die for extruding the honeycomb structural body considered as the premise of the present invention.

Figure 3A:
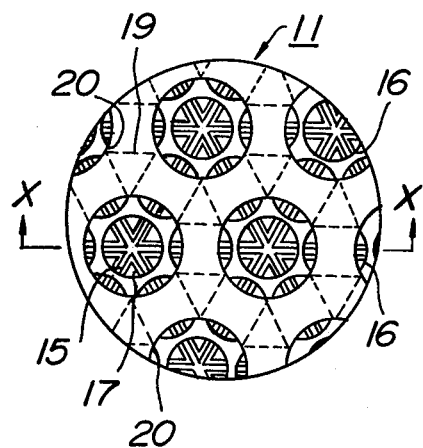
FIGS. 3A, 3B, 3C and 3D show an example of the die for extruding the honeycomb structural body according to the present invention.

A purifying member in an exhaust gas-purifying apparatus of automobile generally has the structure a shown in FIG. 1. In FIG. 1, the numeral 1 represents a purifying member, such as a honeycomb structural body, the numeral 2 represents a partition wall, and the numeral 3 represents the cells, for example, having a cross-section of an equilateral triangle. In this case, the structural body 1 is made of ceramics having excellent heat and corrosion resistance. The thickness of the partition wall 2 (d in inset of FIG. 1) is about 0.1 to 0.15 mm and the length of the side of the partition wall (l in inset of FIG. 1) is about 1.0 to 1.2 mm. In the extrusion of the honeycomb structural body, raw ceramic stock in a cylinder (not shown in the figure) is forcedly fed towards a die and continuously extruded by the die into a honeycomb structural body.

FIGS. 2A, 2B and 2C show a die for extruding a honeycomb structural body. FIG. 2A is a view from the rear surface side, FIG. 2B is a view from the front surface of the die. FIG. 2C is a cross-sectional view taken on the line X-X' in FIGS. 2A and 2B.

In FIGS. 2A, 2B and 2C, the numeral 4 is a die for extruding the honeycomb structural body, the numeral 5 is the rear surface of the die, that is the end surface of the cylinder side of the die 4, the numeral 6 is the front surface of the die, the numeral 7 is the opening portion, which is constituted with a plurality of feed inlets 9 and guide slots 10 of the opening portion 7, and the numeral 8 is the discharge slits, which have the cross-section corresponding to the partition wall 2 of the honeycomb structural body. The feed inlets 9 are, for example, provided opposite to each intersection of the discharge slits 8 with each other. The guide slots 10 of the opening portion 7, decreases the fluid resistance so that the raw stock forcedly supplied to the feed inlets 9 is sufficiently supplied to the discharge slits 8.

The raw stock is forcedly supplied in the cylinder (not shown in the figure) to the feed inlets 9 in such a state that the raw stock flow is throttled. After the raw stock is forcedly supplied to the feed inlets 9, it passes to the guide slots 10 of the opening portion 7 in such a state that the flow is spread. The raw stock forcedly supplied in the guide slots 10 of the opening portion 7 is again throttled and forcedly supplied to the discharge slits 8 and extruded into the honeycomb structural body corresponding to the cross-sectional shape of the discharge slits 8.

However, the die 4 for extruding honeycomb structural body has the following problems. That is, the die for extruding the honeycomb cells having the regular triangular cross-section must possess the same number of the feed inlets 9 as the number of intersections of the discharge slits 8, so that the feed inlets 9 are opposite to the intersections. This is based on the following reason. If the feed inlets are formed in such a state that the number of the feed inlets 9 is smaller than the number of the intersecting portions of the discharge slits 8, the extrusion rate of the raw stock at the intersections opposite to the feed inlets 9 is much larger than the extrusion rate of the raw stock at the side portions where are not opposite to the feed inlets 9 and the extrusion rate of the raw stock passing through the discharge slits 8 becomes irregular resulting in an extruded honeycomb structural body of lower mechanical strength. Where feed inlets 9 exist in the same manner as the intersections of the discharge slits 8 they are made large in order to make the extrusion rate of the raw stock passing through the feed slits 8 uniform. For example, when the purifying apparatus 1 as shown in FIG. 1 is extruded, the diameter of the feed inlets 9 is generally selected to be 0.8 to 1.0 mm. Therefore, at the portion where the width between the adjacent feed inlets 9 at the opening portion 7 is smallest, is about 0.2 mm and there is a problem with respect to the mechanical strength of the die 4 as a whole. Considering this point in the die 4 as shown in FIG. 2, the depth of the feed inlets 9 is made to be as large as possible and for example, it is necessary to make the depth to be about 30 to 50 mm. However, great skill is required for production of the die 4 in which the width between the adjacent feed inlets 9 is very small (about 0.2 mm), thd depth of the feed inlets 9 is large (about 30 to 50 mm) and the feed inlets 9, the diameter of which is small (about 1.0 mm), are bored closely as shown in FIG. 2. Furthermore, such feed inlets 9 are small in the diameter and large in the depth, so that the side surface resistance increases and a large extrusion pressure must be applied to the die 4.

The present invention aims to solve the above described problems and to simplify production of the die and to decrease the side surface resistance while increasing the mechanical strength of the die itself. The present invention will be explained with reference to FIGS. 3A, 3B, 3C and 3D.

Figure 3B:
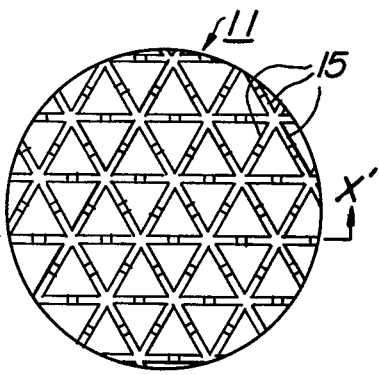
Figure 3C:
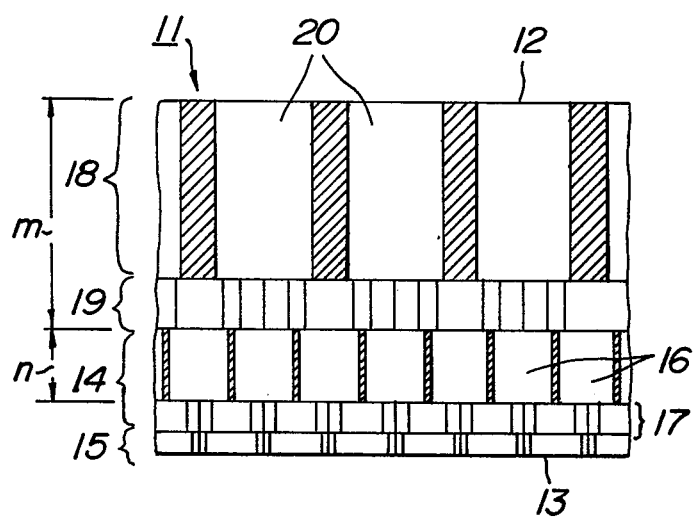
Figure 3D:
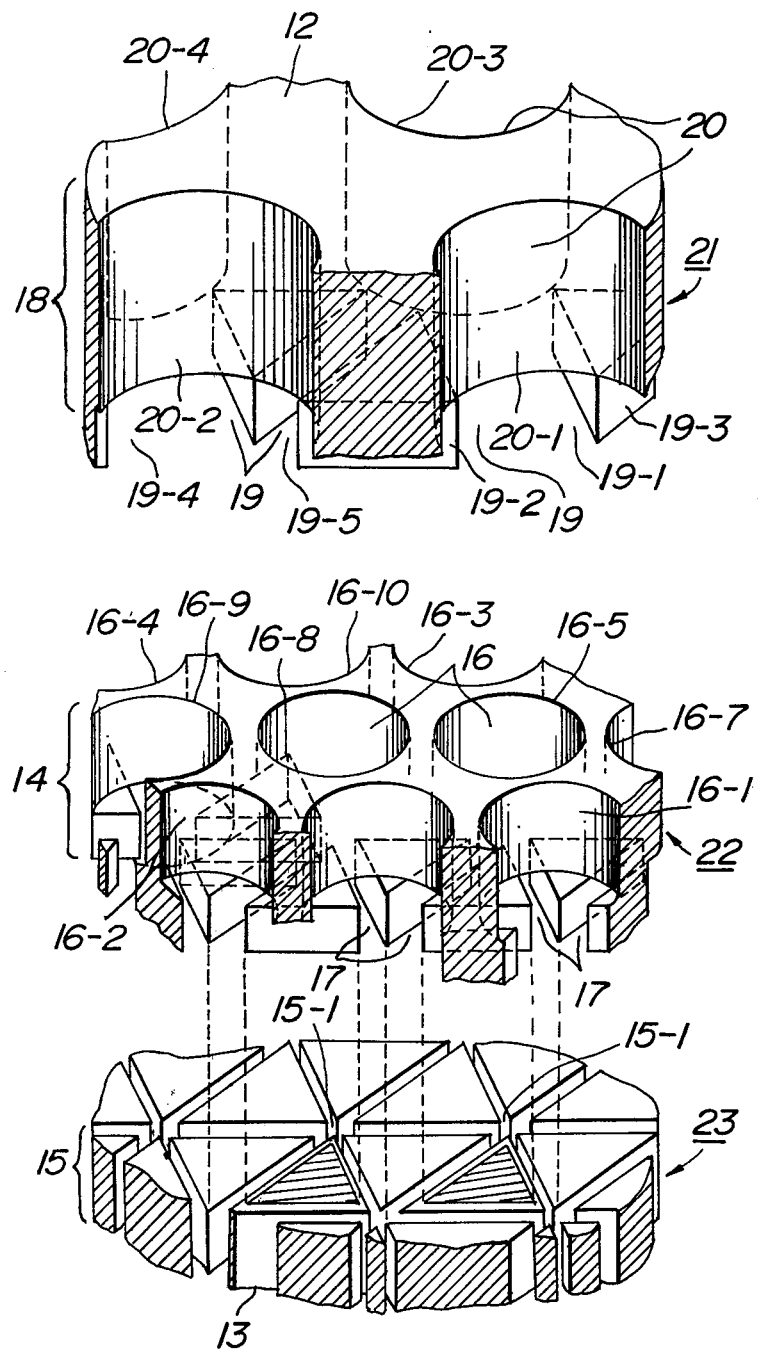

FIGS. 3A, 3B, 3C and 3D show an example of the present invention. FIG. 3A is a view from the rear surface of the die, FIG. 3B is a view from the front surface, FIG. 3C, is the cross-sectional view taken on the line X—X' in FIGS. 3A and 3B. FIG. 3D is a perspective view of the die of the present invention, which is divided into a plurality of blocks for easiness of the explanation of the structure of the die of the present invention.

In FIGS. 3A, 3B, 3C and 3D, the numeral 11 is the die for extruding the honeycomb structural body, the numeral 12 is the rear surface of the die 11, the numeral 13 is the front surface of the die 11, the numeral 14 is the opening portion, the numeral 15 is the discharge slits, the numeral 16 is the openings at the opening portion 14, for example, circular holes, the numeral 17 is the guide slots at the opening portion 14, the numeral 18 is the throttle portion, the numeral 19 is the reservoir portion, the numeral 20 is the openings at the throttle portion 18, for example, circular holes, the numeral 21 is the first block, the numeral 22 is the second block and the numeral 23 is the third block respectively.

As apparent from viewing second block 22 and the third block 23 shown in FIG. 3D, each opening 16 at the opening portion 14 is provided opposite to each intersection 15-1 of the discharge slits 15. The guide slots 17 at the opening portion 14, the width of which is larger than the width of the discharge slits 15, are provided between the openings 16 and the discharge slits 15. As apparent from viewing the first block 21 and the second block 22 shown in FIG. 3D, each opening 20 in the throttle portion 18 is provided opposite to an opening 16, for example, by being positioned at every other opening 16 at the opening portion 14 and each has a larger diameter than the opening 16 at the opening portion 14. Namely, for example, the openings 20-1, 20-2, 20-3, 20-4 at the throttle portion 18 are provided so as to be opposite to the openings 16-1, 16-2, 16-3 and 16-4, respectively. Furthermore, between the openings 20 at the throttle portion 18 and the openings 16 at the opening portion 14, the reservoir portion 19, that is the guide channels at the reservoir portion 19, which connect the adjacent openings 20 with one another, are provided.

The flowing state of the raw stock when the raw stock is extruded, will be explained with reference to FIG. 3D hereinafter.

The raw stock flow forcedly supplied in the cylinder (not shown in figure) is throttled and supplied to the openings 20. The raw stock flow passing through the openings 20 is spread and supplied to the reservoir portion 19 and reserved therein, after which the raw stock flow is again throttled and supplied to the openings 16 at the opening portion 14. Thus, for example, the raw stock passing through the opening 20-1 is spread and supplied to the guide channels 19-1, 19-2, 19-3, ... at the reservoir portion 19 in six directions from the opening 20-1, and supplied to the opening 16-1 which is directly opposite to the above described opening 20-1, and the other six openings 16-5, 16-6, 16-7, ... which are adjacent to the opening 16-1. Similarly, for example, the raw stock passed through the opening 20-2 is spread and supplied to the guide channels 19-2, 19-4, 19-5, ... and supplied to the opening 16-2 and the other six openings 16-6, 16-8, 16-9, ..., which are adjacent to the opening 16-2. Furthermore, similarly the raw stock passed through the opening 20-3 is supplied to the opening 16-3 and the other six openings 16-5, 16-8, 16-10, ..., which are adjacent to the opening 16-3 and the raw stock passed through the opening 20-4 is supplied to the opening 16-4 and the other six openings 16-9, 16-10, ..., which are adjacent to the opening 16-4.

Accordingly, the extrusion rates of the raw stock passing through the openings 16-1 to 16-10 become substantially equal. The raw stocks passed through the openings 16-1 to 16-10 are supplied to the guide slots 17 at the opening portion 14 and spread and then supplied to the discharge slits 15 in the throttled state, and the raw stock passes through every portion of the discharge slits 15 at substantially the same rate to extrude the honeycomb structural body.

In the case of the die 11 of the present invention, the mechanical strength of the die 11 as a whole is determined by the thickness of the throttle portion 18 and the reservoir portion 19 (shown by m in FIG. 3C). When the above thickness m is selected to be, for example, 50 mm, even if the depth of the openings 16 (shown by n in FIG. 3C) is selected to be about 5 mm, the mechanical strength of the die 11 as a whole can be satisfactorily high. Therefore, it is possible to make the depth of the openings 16 fully small and boring the openings 16 becomes very easy.

Although the first block 21, the second block 22 and the third block 23 are separately shown in the above FIG. 3D, these blocks are naturally formed integrally. Namely, the above described throttle portion 18, the reservoir portion 19, the openings 16 at the opening portion 14, the guide slots 17 at the opening portion 14 and the discharge slits 15 are formed in one block.

More than one set of the throttle portion and the reservoir portion may be provided repeatedly.

As mentioned above, according to the present invention, the forming the openings 16 can be very easily carried out. In this case, forming the openings 20 at the throttle portion 18 can be conducted by making the number of the openings 20 to be half of the number of the openings 16 and the diameter of the openings 20 can be made to be larger than the diameter of the openings 16, so that forming the openings 20 is easier than that for forming the openings 16. Furthermore, the present invention can increase the mechanical strength of the die 11 as a whole and can satisfactorily decrease the side surface resistance of the openings 16.

Furthermore, in the present invention, it is not necessary to form the openings 16 so as to be opposite to the intersections of the discharge slits 15 and for example, it is possible to form the openings 16 so as to be opposite to the side portions of the discharge slits.

In the production of the die for extruding the honeycomb structural body according to the present invention, for example, the blocks 21, 22 and 23 as shown in FIG. 3D are bonded by diffusion welding through the diffusion welding process of the mutual metals. In this case, the reservoir portion 19 may be formed or bonded on the upper end surface of the openings 16 in the second block 22 and then the reservoir portion is bonded to the first block 21.

What is claimed is:

1. In a die for extruding a honeycomb structural body comprising
    discharge slits having a cross-sectional shape corresponding to that of the honeycomb structural body and having a given depth towards the rear surface of the die from the front surface, and
    an opening portion having a plurality of openings which are connected to the discharge slits at intersecting portions or side portions thereof, an improvement further comprises
    at least one set of a throttle portion having a plurality of openings and a reservoir portion secured to the rear surface of the opening portion in such an arrangement that the reservoir portion is provided between the throttle portion and the opening portion,
    the openings in the throttle portion in one set of the throttle portion and the reservoir portion, which set is arranged at the rear side of the opening portion, being larger in diameter and smaller in number than those in the opening portion,
    said reservoir portion being constituted with a plurality of guide channels connecting adjacent openings of the throttle portion with one another and the openings in the opening portion;
    the discharge slits, the opening portion and at least one set of the throttle portion and the reservoir portion being constructed in monolith, whereby a raw stock flow supplied to the openings in the throttle portion is spread into the guide channels in the reservoir portion, the spread raw stock is fed into the openings in the opening portion and finally, the raw stock flow passed through the openings in the opening portion is extruded through the discharge slits.

* * * * *